United States Patent [19]

Petschner

[11] Patent Number: 5,032,267

[45] Date of Patent: Jul. 16, 1991

[54] APPARATUS FOR FILTERING A HEAT-SOFTENED STREAM OF PLASTIC MATERIAL

[75] Inventor: Goetz Petschner, Zollikon, Switzerland

[73] Assignee: Indupack AG, Zug, Switzerland

[21] Appl. No.: 261,358

[22] Filed: Oct. 21, 1988

[30] Foreign Application Priority Data

Oct. 29, 1987 [CH] Switzerland ............... 04248/87

[51] Int. Cl.⁵ ................................. B29C 47/68
[52] U.S. Cl. ..................... 210/236; 210/329; 210/333.01; 210/334; 210/426; 425/185; 425/199; 425/130; 425/131.1; 425/190
[58] Field of Search ............ 210/797, 798, 411, 424, 210/425, 427, 426, 329, 333.1, 333.01, 236, 241, 330, 334, 340, 341; 425/185, 186, 199, 130, 131.1, 190

[56] References Cited
U.S. PATENT DOCUMENTS

| | | | |
|---|---|---|---|
| 4,395,212 | 7/1983 | Lambertus | 425/186 |
| 4,701,118 | 10/1987 | Köching et al. | 425/185 |
| 4,752,386 | 6/1988 | Schulz et al. | 425/199 |
| 4,781,563 | 11/1988 | Capelle | 425/199 |
| 4,814,186 | 3/1989 | Trott | 425/199 |

Primary Examiner—W. Gary Jones
Assistant Examiner—Matthew O. Savage
Attorney, Agent, or Firm—Herbert Dubno

[57] ABSTRACT

In the filtering apparatus for an extrusion machine, a stream of heat-softened plastic material arrives via a flow conduit in a filter housing at an outlet, and thereby permeates replaceable filter means which are carried by a slide which is temporarily slid out of the stream of plastic material. For this, the slide comprises two chambers, forming flow conduit sections and arranged spaced in tandem in the direction of displacement, both of which are closed by filter plates. The slow conduit sections being, at a specified position of the slide in the filter housing internally in flow connection via, in each case, a port, with the outlet conduit in the filter housing and, externally via the filter plates, with the inlet conduit or with a backflow conduit in the filter housing.

4 Claims, 1 Drawing Sheet

APPARATUS FOR FILTERING A HEAT-SOFTENED STREAM OF PLASTIC MATERIAL

FIELD OF THE INVENTION

The present invention relates to a method for filtering a heat-softened stream of plastic material on its path through a flow conduit in a filter housing to a die of an extrusion machine, the heat-softened stream of plastic material being pressed through replaceable filter means which are carried by slide means which are temporarily moved out of the stream of plastics material.

BACKGROUND OF THE INVENTION

Extrusion processes by which heat-softened plastic materials are extruded through dies by means of a screw or ram, can be used for the manufacturing of, for example, foils and other articles.

In apparatus of this kind, it is customary to press the heat-softened plastics material through filter means in order to remove impurities. The filter means can be moved across the flow path of the plastic material to be filtered in order to replace the clogged filter means with unclogged means, for which the filter means are carried by slide means.

Such apparatus is of complicated construction, however, to be able to move such slides, which stand under relatively high flow pressure, across the flow path of the plastic material. As a rule, the flow has to be interrupted in order to replace a filter. If raw materials (granulated materials) with a high degree of impurity (for example, through recycling) are employed, then such apparatus quickly prove unprofitable due to increased filter consumption. A further disadvantage is also that after changing a filter, air is inevitably brought into the stream of thermoplastics together with the filter, which leads to unusable sections of extrudate.

OBJECTS OF THE INVENTION

Therefore, it is thus the object of the present invention to provide a method that permits less filter consumption, yet ensures, nevertheless, an effective and economically-warrant-able cleansing of even a very impure stream of heat-softened plastic material, and, moreover, excludes faults in the extrudate caused by air bubbles.

Another object is to provide an apparatus for carrying out the method.

SUMMARY OF THE INVENTION

These objects are achieved according to the invention in that the flow of plastic material is continuously maintained and thus conducted through the one or the other of two flow conduit sections, defined by said filtering means and slidable relative to the inlet conduit of the filter housing, said filter means of the respective flow conduit section being, in an initial displaced position towards said inlet conduit, exposed to a backflow of warm and soft plastic material, and, in a second displaced position, replaceable.

Thus, in the first place, a reduced through-flowability due to contamination of said filter means of one or the other flow conduit sections may be counteracted by means of a backflow flushing or, if required, by replacement, without, having to interrupt the extrusion process therefor.

Of most considerable importance is, moreover, also, that after a change of filter, the air trapped in the respective flow conduit section can be completely removed by a backflow flushing prior to the slide-in of said conduit section into the continuous stream of heat-softened plastics material, so that the hitherto unavoidable waste sections of extrudate after a replacement of filter can be avoided completely.

For the flow-pressure-relieved displacement of said slide, the flow conduit section of the oncoming flow or of the backflow, can be symmetrically exposed.

Furthermore, it is of advantage that a partial stream of filtered outlet flow is diverted for the backflow.

In addition, the present invention relates to a filtering apparatus for extrusion machines by which a heat-softened stream of plastic material arrives through a flow conduit in a filter housing, at an outlet and thereby passes through replaceable filter means which are carried by sliding means which are temporarily slid out of the stream of plastic material in order to effect the method.

The filtering apparatus has one slide which comprises at least two chambers, forming flow conduit sections spaced in tandem in the direction of displacement, both of which are closed by filter plates. The flow conduit sections are, at a specified position of the slide in the filter housing, internally in flow connection via, in each case, a port, with said outlet conduit in the filter housing and, externally, via the filter plates, with one inlet conduit or with a backflow conduit in said filter housing.

In order to permit a flow-pressure-relieved displacement of the slide, it is of advantage that at least the inlet conduit is in flow connection, via branch pipes on both sides of the flow conduit sections of the slide, with the flow sections via the filter plates.

To ensure that the heat-softened stream of plastic material is maintained right through the filtering apparatus in each position of the slide relative to the inlet conduit in the filter housing, it is necessary that the spacing of the branch pipes in the filter housing in the direction of displacement of the slide, corresponds at least to the spacing of said flow conduit sections arranged in said slide, as well as the spacing between inlet conduit or the respective branch pipes, corresponding at least to the cross-sectional extension of a flow conduit section in the direction of displacement.

BRIEF DESCRIPTION OF THE DRAWING

An embodiment of the present invention will now be more particularly described by way of example with reference to the accompanying drawing, in which.

SPECIFIC DESCRIPTION

Figure 1:
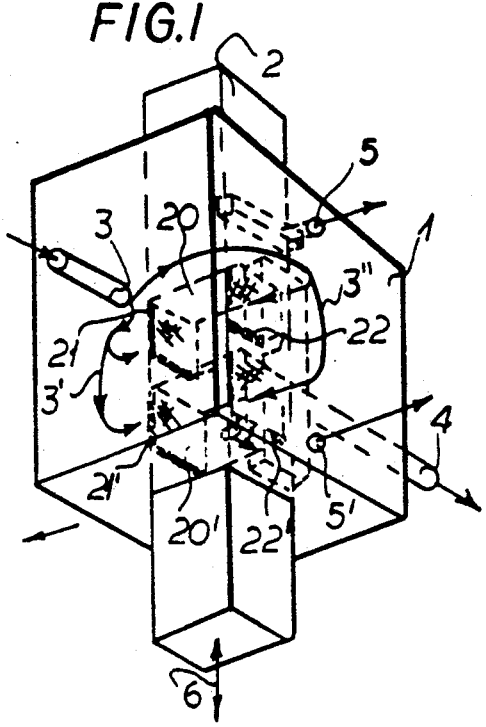
FIG. 1 is diagrammatic prespective view of the filtering apparatus for extrusion machines for filtering heat-softened plastic material according to the invention.

The filtering apparatus represented in the drawing comprises a filter housing 1 having an inlet-side flow conduit or inlet 3 connectable to known conveyor device (not shown in detail) of an extrusion machine and a flow conduit section or outlet 4 connectable to an extrusion die or the like.

In the housing 1, a slide 2 is guided and may be advanced by suitable positioning members (not shown) in the direction of the arrow 6 in FIG. 1 relative to the housing 1 and the inlet conduit 3, and held there. The slide is displaceable from a means position (shown in FIG. 1), upwards or downwards to an intermediate or flushing position and then further upwards or downwards to an outer end or replacement position, as is described in greater detail below.

It is to be emphasized here that the illustrated and described apparatus is shown by way illustration only, and that various changes and modifications with regard to shape, construction and direction of the conduit in the housing 1 and slide 2 may be made without departing from the spirit of the present invention.

Essential to the invention is that the slide 2 comprises here two chambers 20 and 20', forming flow conduit sections and arranged spaced in tandem in the direction of displacement, both of which are closed by filter plates 21 and 22, respectively, 21' and 22', and which when in the mid-position of said slide 2 (FIGS. 1 and 3), communicate, via branch pipes 3' and 3", with said inlet conduit 3. In this connection, for a flow-pressure-relieved displacing a said slide 2, said flow sections 20, 20' of the oncoming flow or the backflow, are symmetrically exposed, as will be illustrated below. This means at the same time, a pressure relief due to equalization of pressure on the filters.

Figure 3:
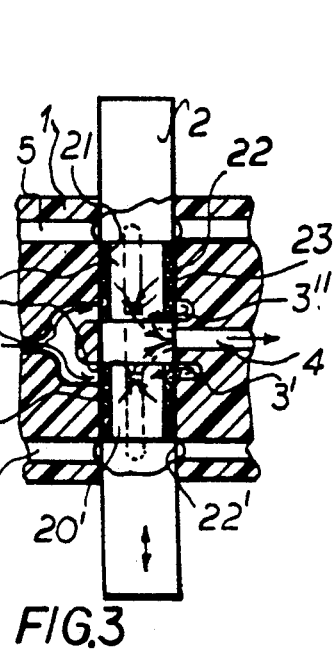
FIGS. 3 through 5 are cross-sectional views of the apparatus shown in FIG. 1, illustrating other operating positions.
Figure 4:
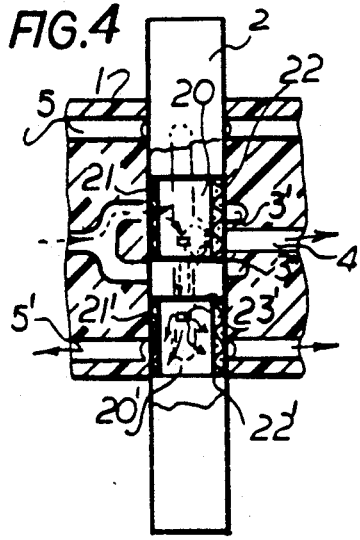
Figure 2:
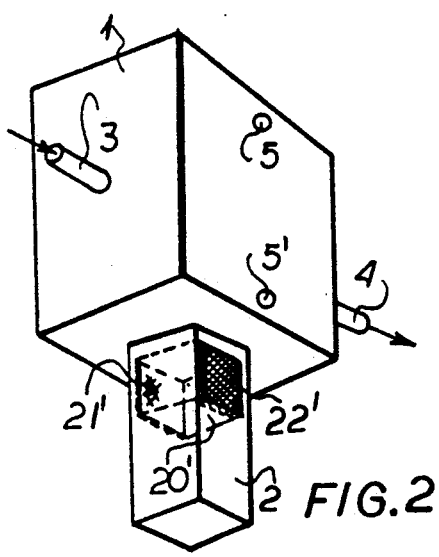
FIG. 2 is a perspective view of the apparatus shown in FIG. 1 viewed in another operating position.
Figure 5:
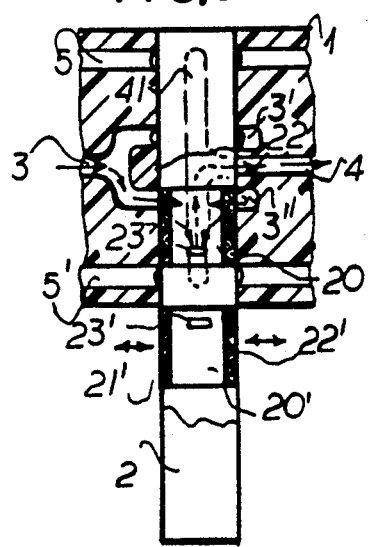

As further shown in FIGS. 3 through 5 in particular, the flow conduit sections 20, 20' are, at a specified position of the slide 2 in said fliter housing 1, internally in flow connection via, in each case, a port 23 or 23', with said outlet conduit 4 in the filter housing 1 and, externally, via said filter plates, with the inlet conduit 3 or with a backflow conduit 5 or 5' in said filter housing 1.

In this connection, the spacing of the branch pipes 3', 3" in the filter housing 1 in the direction of displacemet of said slide 2 corresponds at least to the spacing of said flow conduit sections 20, 20' arranged in said slide 2, as well as the spacing between inlet conduit 3 or, the respective branch pipe 3', 3" and the one or the other backflow conduits 5 or 5', corresponds at least to the cross-sectional extension of a flow conduit section 20, 20' in the direction of displacement.

This ensures that the heat-softened stream of plastic material is maintained in every aforementioned position of said slide 2 relative to said inlet conduit 3 in said filter housing 1.

In the mid-position of said slide 2 in said housing 1 (FIG. 3), the impure stream of thermoplastics can thus penetrate into both chambers 20 and 20' from both sides through said filters 21 and 22, respectively, 21' and 22', and exit filtered via said ports 23 or 23' in the one or the other chamber walls or in both chamber walls and the suitably formed outlet conduit 4.

For a backflushing of said filters 21', 22' of said lower conduit 21 in the representation, said slide 2 is displaced downwards somewhat, until this comes out of the region of flow of the lower branch pipe 3" (FIG. 4). Thus a part of the filtered outlet stream can flow into this conduit section 21 via said port 23' and exit through said filter 21' and 22' thereof via the communicating backflow conduit 5, with which flow, a flushing and therewith cleansing of the respective filter takes place. The heat-softened stream of plastic material then continues uninhibited through the upper conduit section 20.

This is also the case when said slide 2 is brought into its replacement position (FIG. 5), whereupon the entry of the thermoplastic material takes place in the upper conduit section 20 via the now lower branch pipe 3".

After a replacement of, for instance, the filters 21' and 22', a restoring of said slide 2 first to the aforementioned flushing position according to FIG. 4 takes place. The backflushing, brought about automatically here, expels the air from the respective conduit section 20', whereupon a displacement to the mid-position or upwards past this to flush or replace the filter of the other conduit section 20 may result.

By means of a pressure probe in the branch pipe (not shown), the prefereably, adjustable threshold value thereof being a standard for the clogging of said filter and said displacement of said slide for a flushing of the respective filter or for the replacement thereof may be controlled automatically.

The previously-described filtering apparatus, which may, of course, be greatly modified within the bounds of the invention, thus permits a process for the filtering of a heat-softened plastics material, without great expenditure of filter means, even if the materials to be extruded are very impure. This is achieved in particular in that a replacement of said filter means becomes necessary only after a repeated flushing thereof. Furthermore, the heat-softened stream of plastic material may be maintained when flushing as well as also when replacing said filter means and imperfections in the extrudate due to air being inserted at filter replacement are impossible.

Moreover, it is of quite considerable importance that said slide may be displaced relieved of flow pressure, for both the oncoming flow as well as also the backflow become symmetrically effective on said slide. The latter may be achieved, for example, in that the outlet conduit 4 in the filter housing 1 is in flow connection, via branch ducts 41 or both sides of the slide 2, with the flow conduit sections 20 or 20' via ports 23 or 23' lying, then, opposite thereto.

While there are shown and described preferred embodiments of the invention, it is to be distinctly understood that the invention is not limited thereto but may be embodied and practised within the scope of the following claims. Accordingly,

What I claim is:

1. An apparatus for filtering a heat-softened stream of plastic material for an extrusion machine, comprising:
    a filter housing formed with an inlet receiving said heat-softened stream and an outlet for discharging said stream after filtration;
    a slide shiftable in said housing in a sliding direction and formed with at least two chambers spaced apart in said direction, said slide being shiftable between a first position for filtering said stream through both of said chambers, a second position for filtering said stream through one of said chambers and backflushing another of said chambers, and a third position wherein said other of said chambers is external of said housing for filter replacement;
    respective pairs of opposing replaceable filter plates closing opposite sides of said chambers;
    means defining flow channels in said housing in communication with said outlet and internally communicating with said chambers in both said first and second positions of said slide;
    inlet branch conduit means in said housing connected to said inlet and directing said stream symmetrically from opposite sides against said filter plates of said chambers in said first position of said slide; and at least one back flow passage formed in said housing and communicating with the filter plates of said other of said chambers in said second position and prior to movement of said slide from said first position to said third position and from said third position to said first position to backflush the plates of said other chamber with a portion of said stream after filtration.

2. The apparatus defined in claim 1 wherein said inlet branch conduit means includes a pair of branches respectively communicating with said chambers in said first position of said slide and spaced apart in said direction by a distance equal at least to a spacing of said chambers.

3. The apparatus defined in claim 2 wherein said back flow passage is spaced from a respective one of said branches by a distance equal substantially to a dimension of said other of said chambers in said sliding direction.

4. The apparatus defined in claim 3 wherein said slide has only two said chambers.

* * * * *